(12) United States Patent
Li et al.

(10) Patent No.: US 7,035,187 B2
(45) Date of Patent: Apr. 25, 2006

(54) APPARATUS AND METHOD FOR GENERATING RFZC SIGNAL FOR OPTICAL SYSTEMS

(75) Inventors: Sung-Hung Li, Shindian (TW); Yi-Lin Lai, Shindian (TW)

(73) Assignee: Via Technologies, Inc., (TW)

( * ) Notice: Subject to any disclaimer, the term of this patent is extended or adjusted under 35 U.S.C. 154(b) by 349 days.

(21) Appl. No.: 10/318,178

(22) Filed: Dec. 13, 2002

(65) Prior Publication Data

US 2004/0114489 A1    Jun. 17, 2004

(51) Int. Cl.
*G11B 7/00* (2006.01)
(52) U.S. Cl. .................... 369/53.28; 369/44.28
(58) Field of Classification Search ............ 369/59.17, 369/59.18, 47.35, 53.28
See application file for complete search history.

(56) References Cited

U.S. PATENT DOCUMENTS

| | | | | |
|---|---|---|---|---|
| 5,034,940 A | * | 7/1991 | Saito et al. ............... | 369/44.34 |
| 5,359,585 A | * | 10/1994 | Tanoue et al. ............ | 369/47.35 |
| 5,490,127 A | * | 2/1996 | Ohta et al. ................ | 369/47.51 |
| 5,680,380 A | * | 10/1997 | Taguchi et al. .......... | 369/47.35 |
| 6,144,742 A | * | 11/2000 | Gotoh et al. ............. | 369/53.21 |
| 6,243,344 B1 | * | 6/2001 | Tani ......................... | 369/59.17 |
| 6,762,982 B1 | * | 7/2004 | Armitage ................. | 369/47.25 |
| 2001/0010673 A1 | * | 8/2001 | Chan ....................... | 369/53.28 |
| 2002/0181374 A1 | * | 12/2002 | Lai .......................... | 369/53.35 |

* cited by examiner

*Primary Examiner*—Brian E. Miller
*Assistant Examiner*—Peter Vincent Agustin
(74) *Attorney, Agent, or Firm*—Rabin & Berdo, PC

(57) ABSTRACT

An apparatus and related operating method for generating slice levels adapted to an optical system is disclosed. The apparatus basically encompasses a multiplexer, a low-pass filter, a digital signal processor (DSP), a digital-to-analog converter, and a comparator. In the beginning of the track-crossing operation, the optical system will enter the first DAC mode that a pre-stored slice level derived from a calibration process is accessed and converted by the digital-to-analog converter before being referred as the slice level in the first DAC mode. When the low-pass filter can follow the RFRP signal variations, the low-pass filter is used to receive the RFRP signal and derive the slice level in the low-pass-filter mode. When a track-on command is given, the optical system will enter the second DAC mode and find an average value of the last peak-hold and bottom-hold values derived at the end of the low-pass-filter mode. The average value will be frozen and referred as the slice level in the second DAC mode, and even in the following mode after the current track-crossing operation.

20 Claims, 2 Drawing Sheets

APPARATUS AND METHOD FOR GENERATING RFZC SIGNAL FOR OPTICAL SYSTEMS

BACKGROUND OF THE INVENTION

1. Field of the Invention

This invention relates in general to a signal generating apparatus and associated operating method. More specifically, this invention relates to a signal generating apparatus and method that derives RFZC (RF zero crossing) signals adapted to an optical system.

2. Description of Related Art

An optical system accesses data from a disc by moving its optical pick-up head along the disc radial direction and simultaneously scanning the disc recorded surface by means of emitting laser beams projected onto the rotating disc. The optical pick-up head is driven for reading a target track from the rotating disc when the pick-up head focuses and tracks on the target one. Under the focusing operation, the objective lens moves along the direction perpendicular to the disc surface in order to correctly focus on the optical disc, while the objective lens also moves along the direction parallel to the disc surface and follows the target track for reading data under a following operation. Basically, a laser beam is firstly emitted to project onto the optical disc, while a photo sensor on the optical pick-up head is then used to receive the reflected laser beam. Signals associated with the data recorded on the optical disc or control signals used for servo controls can thus be easily derived from the information embedded in the reflected laser beam. Next, by using a pre-amplifier, those signals obtained by the optical pick-up head will be used for generating an RF signal, and signals for servo controls, such as RFRP (RF ripple) and RFZC (RF zero crossing) signals. Those signals are directed to a digital signal processor (DSP) for further processes.

FIG. 1 shows a phase relationship of the RF, RFRP and RFZC signals, wherein both of the RFRP signal and the RFZC signal are used in an optical system. The RF signal is a high frequency signal and is enveloped by an enveloping signal, which has an inverse phase relationship to the RFRP signal and has a frequency lower than the RF signal. An RFZC signal can be obtained by comparing the RFRP signal with a relative slice level (such as a dash line depicted in FIG. 1) that can be indicated by an average value of the RFRP signal. Therefore, the RFZC signal will be a positive value when the RFRP signal is larger than the slice level, while the RFZC signal will be a negative one when the RFRP signal is less than the slice level. Sometime the RFRP signal might drift from a normal level under certain situations. FIG. 2 shows a waveform diagram of the RFRP signal when the optical system varies from a following, seeking, and finally back to the following modes. In FIG. 2, the RFRP signal remains constantly before time point T0 under the following mode, and the peaks of RFRP signal drifts down from normal level at T0 at the beginning of the seeking mode. Furthermore, the RFRP signal turns constantly after T3 while seeking mode is finished. Obviously, if a constant voltage is used to slice the drifted RFRP signal under the seeking mode (between T0 to T3), more errors will be arisen and introduced into the duty cycle of the RFZC signal, which significantly affects the performance of the optical system.

A low-pass filter is used for obtaining the slice level conventionally, but the low-pass filter cannot catch the RFRP signal variations in the beginning of the seeking mode (i.e., at T0). Basically, the RF signal will be manipulated by a high-pass filter to filter out its DC level for further processing, but also unfortunately, to pass the high-pass filter will lower down the peak values of the RFRP signal. The above two effects will make the duty cycle of the RFZC signal vary out of 50 percent. Another conventional approach employs the DSP of an optical system to calculate required RFZC signal by averaging the peak-hold and bottom-hold values derived from the RFRP signal. The system performance of the optical system is therefore degraded since DSP load will be heavier than before. A further conventional approach employ hardware circuit to derive the RFZC signal, but this hardware circuit will be always activated to and provide RFZC values whatever the optical system needs, which obviously causes unnecessary calculation operations and power consumption. On the other hand, a glitch will appear in the obtained RFZC signal at the end of the seeking mode if the low-pass filter is used for obtaining the slice level, which still seriously affects the signal accuracy of the optical system. A need has been arisen to disclose an apparatus and related operating method for deriving an RFZC signal having 50% duty cycle and more adapted to an optical system so that the above disadvantages can be eliminated simultaneously.

SUMMARY OF THE INVENTION

According to the foregoing description, an object of this invention is to provide an apparatus and relative operating method that generates the RFZC signal adapted to track-crossing operations so that the RFRP signal can be properly sliced to generate a proper RFZC signal when an optical system crosses tracks to a target one.

According to the object mentioned above, the invention provides an apparatus and method for generating an RFZC signal adapted to the optical system. The disclosed apparatus basically encompasses a multiplexer, a low-pass filter, a digital signal processor (DSP), a digital-to-analog converter, and a comparator. The optical system employs a low-pass filter to follow the RFRP signal but cannot follow the RF signal variations in the beginning of the seeking mode. The optical system of the embodiment uses three operation modes, the first DAC (Digital-to-Analog) mode, the low-pass-filter mode, and the second DAC mode to provide slice levels adapted to RFZC signal. When the optical system has to seek a target track for accessing data, it goes into the first DAC mode and the digital-to-analog converter is used to convert a slice level, which is derived from a calibration process while the currently accessed optical disc being read by the optical system. Next, the optical system will select the RFZC signal derived from the low-pass filter in a low-pass-filter mode when this low-pass filter can follow the RFRP signal variations. When a track-on command is given, the optical system will go into the second DAC mode and find an average value of the last peak-hold and bottom-hold values derived at the end of the low-pass-filter mode. This average value is also converted by the digital-to-analog converter and then frozen from now on so that the second DAC mode and even the coming following mode can refer this average value as required slice level.

BRIEF DESCRIPTION OF THE DRAWINGS

While the specification concludes with claims particularly pointing out and distinctly claiming the subject matter which is regarded as the invention, the objects and features of the invention and further objects, features, and advantages thereof will be better understood from the following description taken in connection with the accompanying drawings in which:

DESCRIPTION OF THE PREFERRED EMBODIMENT

Figure 1:
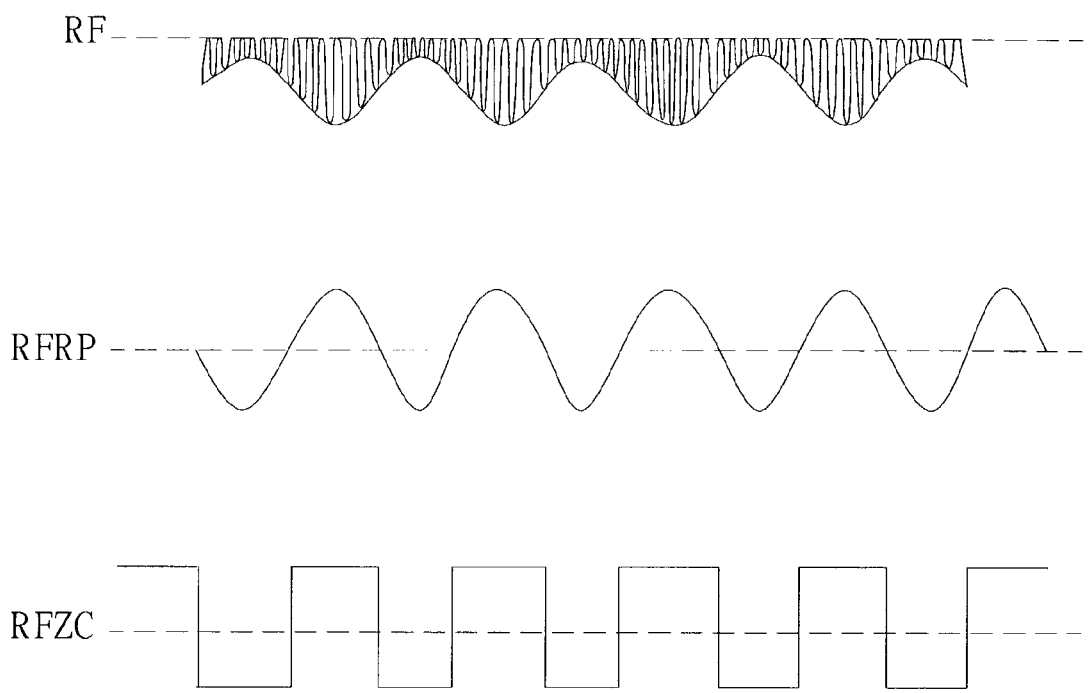
FIG. 1 shows a phase relationship diagram among the RF signal, the RFRP signal and the RFZC signal in an optical system.
Figure 2:
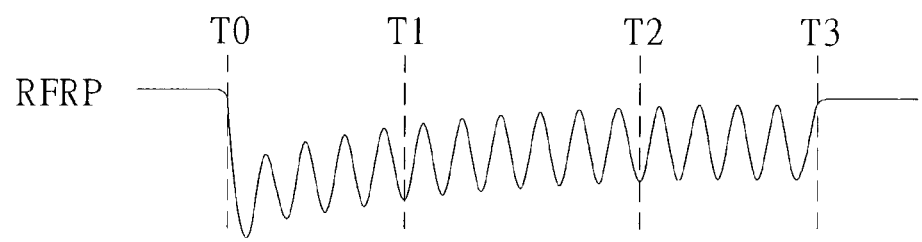
FIG. 2 illustrates an overview for showing the drifting phenomenon of the RFRP signal under the track-crossing operation.

Because the RFRP signal will drift in the seeking mode as described above, the slice level must follow the RFRP signal variations in order to obtain an accurate RFZC signal. FIG. 2 shows the drifting phenomenon of the RFRP signal when the track-crossing operation (i.e., the seeking mode) is performed, wherein time point T0 and T3 represent the beginning and the ending points of the seeking mode, respectively. Two critical time points T1 and T2 are further defined in FIG. 2. In the embodiment, T1 indicates the time point that the low-pass filter has caught the variation speed of the RFRP signal (which may depend on the bandwidth of the low-pass filter), and T2 indicates the time that a track-on command is given for tracking on the target track. The time for giving the track-on command is usually concerned with track-crossing speed because moving speed of the pick-up head will be slowed down for performing track-on operations (e.g., when the crossing speed is less than 10K track/sec). Basically, the low-pass filter bandwidth can be programmable according to applications, and the crossing speed is also depend on various applications, anyone having ordinary skilled in the art may define the above parameters as his specifications.

The derivation of the slice level according to the embodiment is described as follows. In a commonly used approach, a calibration process will be performed to obtain some basic parameters regarding the currently accessed optical disc, and the present invention trickily employs the calibration process to calculate the required parameter for the embodiment. The slice levels in the beginning of the seeking mode can thus be easily calculated and stored by the DSP beforehand (may be store anywhere the DSP can access). Obviously, the optical system may access this stored parameter and then convert it into analog format by means of a digital-to-analog converter between T0 and T1 (i.e., the first DAC mode of the embodiment), which significantly overcome the disadvantages arisen from the laggards of the low-pass filter and the drifting phenomenon caused by the high-pass filter. Next, the RFRP signal will be directed into the low-pass filter for deriving required slice level between T1 and T2 (i.e., the low-pass-filter mode of the embodiment) when the low-pass filter can follow the RFRP signal variations. Finally, at the time point T2 (or, in the beginning of the second DAC mode), the average value of the last peak-hold and bottom-hold values derived in the end of the low-pass-filter mode will be calculated by using the DSP and also converted by the analog-to-digital converter. The converted average value will be treated as the slice level after T2, including the time period after T3 that the target track is on track and return back to the following mode. Basically, the track-on command is given for tracking on the target track at T2 and the low-pass-filter mode should be also terminated at T2 because the valued derived by the low-pass filter is no longer a proper slice level in the embodiment. For example, the derived value from the low-pass filter will be higher and converge to the maximum of the RFRP signal gradually since the RFRP signal becomes a constant value in the following mode. As noted, the slice levels stored in the calibration process can be a total average value of all the peak-hold and bottom-hold values, so that the slice level between T0 and T1 will remain at a constant (i.e., at the total average value) in practice. Furthermore, the slice level between T0 and T1 may be illustrated by using a sequence of values, and each value of this sequence can be derived by averaging two adjacent peak-hold and bottom-hold values. Additionally, the slice level used in the second DAC mode may be the last slice level of the low-pass-filter mode although the average value is the better one for implementations. An ordinary person having skills in the art may modify the embodiment according to applications, but any modification within the spirits of the embodiment should be included in the appended claims.

Figure 3:
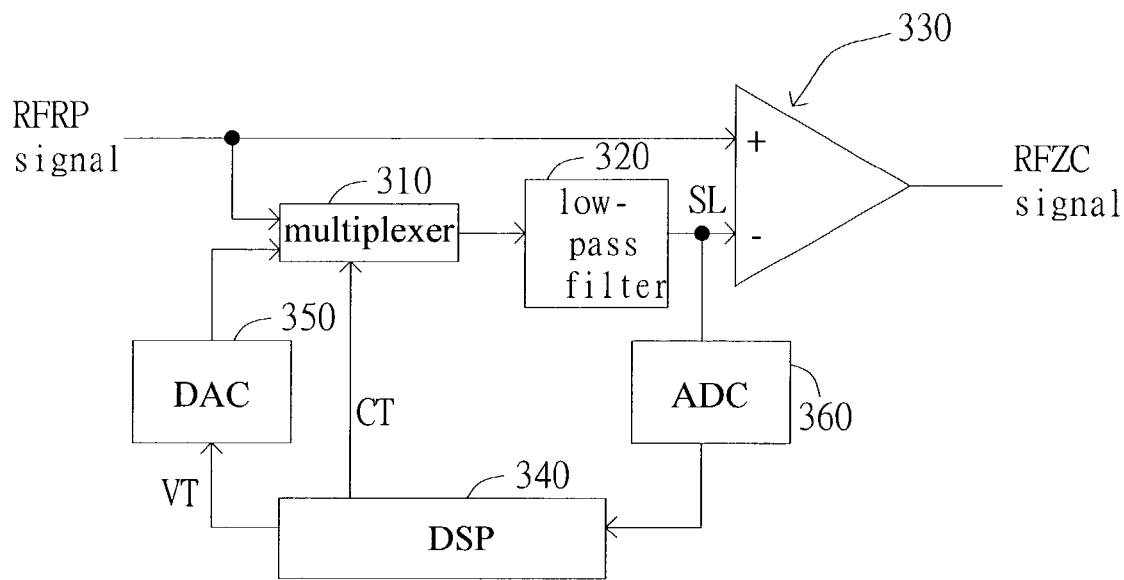
FIG. 3 is a schematic block diagram showing an apparatus for generating slice levels adapted to an optical system according to the embodiment of the invention.

FIG. 3 is a schematic block diagram showing an apparatus for generating an RFZC signal in an optical system according to the embodiment of the invention, which includes a multiplexer 310, a low-pass filter 320, a comparator 330, a digital signal processor (DSP) 340, a digital-to-analog converter 350, and an analog-to-digital converter 360. The multiplexer 310 in the embodiment receives the RFRP signal and a converted signal (the converted one of the VT signal in FIG. 3) from the DSP 340 via two input terminals. A control signal CT delivered from the DSP 340 is used to control the selection operations from two candidates ready at the input terminals. Therefore the converted signal from the DSP 340 can be selected under the first and second DAC modes before feeding into the low-pass filter 320, while the low-pass filter 320 is then used to generate a slice level SL for the comparator 330. On the other hand, the RFRP signal will be directed into the comparator 330 to be compared with the slice level SL converted by the low-pass filter 320 for generating the RFZC signal. The RFRP signal is also fed into the multiplexer 310 for deriving required slice level SL after manipulated by the low-pass filter 320 under the low-pass-filter mode. The optical system will simultaneously store the currently derived slice level (i.e., SL) for further processing. Of course the control signal CT may vary as the operation modes to direct different slice level candidates into the low-pass filter 320. Thereafter, a comparator 330 may compare the RFRP signal and the slice level SL output from the low-pass filter 320 to generate the RFZC signal. Notably, the RFZC signal is a positive value when the RFRP signal is greater than the slice level SL, while the RFZC signal is a negative value when the RFRP signal is less than the slice level SL.

As shown in FIG. 2, the peak values of the RFRP signal waveform suddenly drift down from the normal ones between T0 and T1. An improper slice level will be referred if the low-pass filter 320 is used for generating the slice level at this interval because the low-pass filter 320 cannot catch the RFRP signal variations. Therefore, in the beginning of the track-crossing operation (that is at T0 in FIG. 2), the optical system will go into the first DAC mode so that the DSP 340 will access the slice level(s) obtained in the calibration process and then covert the accessed slice level(s) by using the digital-to-analog converter (DAC) 350. In accompanied with the control signal CT, the converted one from the digital-to-analog converter 350 will be selected and directed into the low-pass filter 320, while the filtered signal output from the low-pass filter 320 will be treated as the slice level SL and become the comparison base for slicing the RFRP signal. When the low-pass filter 320 can follow the RFRP signal at T1, the optical system will enter the low-pass-filter mode that the control signal CT will force the multiplexer 310 to pass the RFRP signal, which is then treated as the SL under the low-pass-filter mode after manipulating by the low-pass filter 320.

The optical system will enter the second DAC mode at T2, wherein the DSP 340 will calculate the average value required for the second DAC mode firstly. Then, the calculated average value will be frozen after T2, even in the following mode after T3. Notably, the slice level SL derived by the low-pass filter 320 is gradually increasing as shown in FIG. 2, which also gradually departs from the correct level if the low-pass filter 320 goes on deriving slice levels for the optical system. A short description is given in the following for explanation purpose.

Figure 4:
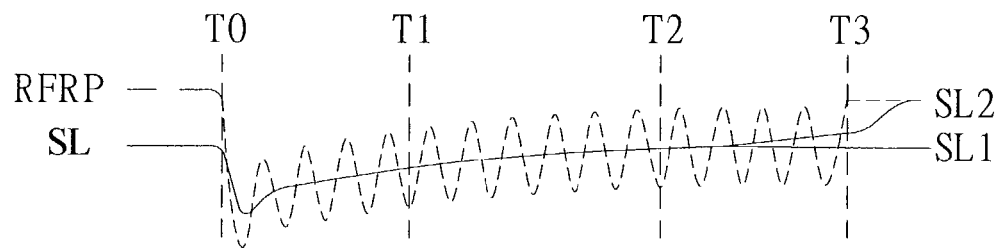
FIG. 4 shows a variation diagram regarding the slice level generated by the disclosed apparatus of FIG. 2.

The RFRP signal substantially converges to a constant after T3 because the target track is on tracked by the optical system and ready for the coming data accessing operations. The low-pass filter 320 is obviously improper used for generating slice level for the optical system. For the sake of clarity, the slice level SL generated by using the disclosed method is specifically shown in FIG. 4, while the definition of T0~T3 is substantially the same as that in FIG. 2. The curve SL2 indicates the curve when the low-pass filter 320 keeps deriving the slice levels for the optical system, while the curve SL1 indicates the curve when the disclosed method is employed. The slice levels provided by the curve SL2 is evidently improper for the following mode because SL2 converges to the maximum of the RFRP signal gradually. Notably, any kind of optical system, including CD-ROM drives, DVD-ROM drives, and optical writers (such as the CD-R/RW, DVD-RAM drives) and their compatible device, can employs the disclosed apparatus for upgrading their system performances and efficiencies.

In conclusion, the disclosed apparatus and method is adapted to an optical system while slicing the RFRP signal as the RFZC signal. When the optical system seeks tracks for accessing data, it goes into the first DAC mode and a digital-to-analog converter is used to convert a slice level (or a sequence of values indicative of slice levels) derived from a calibration process. After the low-pass filter can catch the RFRP signal variations, the optical system then enters a low-pass-filter mode that the optical system employs a low-pass filter to follow the RFRP signal and derive required slice levels. When a track-on command is given, the optical system will go into the second DAC mode and find an average value of the last peak-hold and bottom-hold values derived at the end of the low-pass-filter mode. This digital-to-analog converter is used to convert the average value before referred by both the second DAC mode and the coming following mode.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for providing slice levels of a slice level signal adapted to an optical system, wherein the slice levels of the slice level signal are used to slice an RFRP (RF ripple) signal, the method comprising:
   in response to a track-crossing operation,
      entering a first mode to generate the slice level signal having a first-mode slice level by using a predetermined slice level in a beginning when the optical system starts to perform the track-crossing operation for reading data until about a first time that is determined with respect to a low-pass filter;
      entering a second mode from about the first time to generate the slice level signal having a second-mode slice level by feeding the RFRP signal into the low-pass filter, wherein the first time indicates when the low-pass filter has caught variations of the RFRP (RF ripple) signal; and
      in response to the track-on command, entering a third mode to generate the slice level signal having a third-mode slice level according to an average value derived from the RFRP signal.

2. The method according to claim 1, wherein the predetermined slice level is derived in a calibration process when an optical disc is accessed by the optical system.

3. The method according to claim 2, wherein the predetermined slice level is indicated by a sequence of values derived in the calibration process, and each one of the sequence values is derived by averaging two adjacent peak-hold and bottom-hold values of the RFRP signal.

4. The method according to claim 1, wherein the second-mode slice level is derived by filtering the RFRP signal via the low-pass filter.

5. The method according to claim 1, wherein the third-mode slice level is generated by averaging a last peak-hold value and a last bottom-hold value of the RFRP signal.

6. The method according to claim 1, wherein the RFRP signal is compared with the slice level signal with the first-mode slice level, the second-mode slice level and the third-mode slice level during the corresponding first mode, second mode, and third mode, respectively, to derive an RFZC (RF zero crossing) signal.

7. The method according to claim 1, wherein the third-mode slice level remains constantly before the completion of the track-crossing operation.

8. The method according to claim 1, wherein the third-mode slice level is remained and referred by the optical system after the track-crossing operation is completed.

9. A method for generating an RFZC (RF zero crossing) signal adapted to an optical system having an RFRP (RF ripple) signal, comprising:
   entering a first mode to generate a slice level signal having a first-mode slice level by using a predetermined slice level in the beginning when the optical system starts to cross tracks for reading data until about a first time that is determined with respect to a low-pass filter, wherein the first slice level is derived in a calibration process of the optical system;
   entering a second mode from about the first time to generate the slice level signal having a second-mode slice level by filtering the RFRP (RF ripple) signal via the low-pass filter, wherein the first time indicates when the low-pass filter has caught variations of the RFRP signal; and
   in response to a track-on command, entering a third mode to generate the slice level signal having a third-mode slice level according to a last peak-hold value and a last bottom-hold value;
   wherein the RFRP signal is used to be compared with the slice level signal having the first-mode slice level, the second-mode slice level and the third-mode slice level during the corresponding first, second, and third modes, respectively, to derive an RFZC (RF zero crossing) signal.

10. The method according to claim 9, wherein the predetermined slice level is indicated by a sequence of values derived in the calibration process, and each one of the sequence values is derived by averaging two adjacent peak-hold and bottom-hold values of the RFRP signal.

11. The method according to claim 9, wherein the third-mode slice level is generated by averaging the last peak-hold value and the last bottom-hold value.

12. The method according to claim 9, wherein the third-mode slice level remains constantly before the completion of the track-crossing operation.

13. An apparatus for providing an RFZC (RF zero-crossing) signal using slice levels of a slice level signal adapted to an optical system, wherein the slice levels are used to slice an RFRP (RF ripple) signal, the apparatus comprising:
   a comparator for comparing the RFRP signal with the slice level signal to generate the RFZC signal in response to the RFRP (RF ripple) signal and the slice level signal;
   a circuit for generating the slice level signal, comprising:
      a low-pass filter for outputting the slice level signal; and
      a signal processor for issuing a control signal that controls generation of slice levels of the slice level signal to the optical system, wherein the signal processor generates a first-mode slice level in a first mode by using a predetermined slice level in the beginning when the optical system starts to perform a track-crossing operation for reading data until about a first time that is determined with respect to the low-pass filter; the signal processor directs the RFRP signal into the low-pass filter to generate the slice level signal having a second-mode slice level in a second mode from the first time, wherein the first time indicates when the low-pass filter has caught variations of the RFRP (RF ripple) signal; when a track-on command is given, the signal processor in a third mode generates a third-mode slice level by using at least one slice level of the slice level signal generated in the second mode;
   wherein the signal processor outputs the control signal to indicate when the first-mode slice level, the RFRP signal, and the third-mode slice level are coupled to the low pass filter during the corresponding first mode, second mode, and third mode, respectively.

14. The apparatus of claim 13, further comprising:
   a multiplexer having at least two input terminals, a control terminal and an output terminal, wherein a first input terminal receives the RFRP signal, a second input terminal receives the first-mode slice level and the third-mode slice level, and the control terminal receives the control signal from the signal processor;
   wherein the multiplexer, in response to the control signal, outputs a signal from either the first input terminal or the second input terminal as an adapted slice level, wherein the adapted slice level is manipulated by the low pass filter before directing into the comparator.

15. The apparatus of claim 14, further comprising:
   a digital-to-analog converter for converting the first-mode slice level and the third-mode slice level before feeding into the multiplexer; and
   an analog-to-digital converter for converting the slice level signal output from the low-pass filter before feeding into the signal processor.

16. The apparatus of claim 13, wherein the predetermined slice level is derived in a calibration process of the optical system when an optical disc is accessed by the optical system.

17. The apparatus according to claim 13, wherein the predetermined slice level is indicated by a sequence of values derived in the calibration process, and each one of the sequence values is derived by averaging two adjacent peak-hold and bottom-hold values of the RFRP signal.

18. The apparatus according to claim 13, wherein the second-mode slice level is derived by filtering the RFRP signal via the low-pass filter.

19. The apparatus according to claim 13, wherein the third-mode slice level is generated by averaging a last peak-hold value and a last bottom-hold value of the RFRP signal.

20. The apparatus according to claim 13, wherein the third-mode slice level remains constantly before the completion of the track-crossing operation and referred by the optical system after the track-crossing operation is completed.

* * * * *